Patented Nov. 24, 1953

2,660,535

UNITED STATES PATENT OFFICE 2,660,535

BONDED ARTICLES AND THEIR MANUFACTURE

Howard F. West and John H. Veale, Joliet, Ill., assignors to Illinois Clay Products Company, Joliet, Ill., a corporation of Illinois No Drawing. Application May 13, 1949,
Serial No. 93,195

11 Claims. (Cl. 106—67)

This invention relates to the bonding of various aggregates by an unfired bond developed from aluminum compounds such as clay minerals.

Among other objects the invention aims to provide a strong, low cost bonding substance.

Another object of the invention is to provide an easily prepared strong bonding material wherein the bond is developed without firing.

A still further object is to bond material with an unfired bond without the use of special machinery or techniques.

Other objects and advantages of the invention and the nature thereof may be readily understood by reference to illustrative embodiments thereof described in the following specification.

We have discovered that clays or certain aluminum compounds (which for convenience will be termed clay constituents, whether or not they originate from clay) may be used to bond various aggregates by certain reactions with sulphuric acid. The bond developed by such reaction is an acid aluminum sulphate. Such bonding substances may be formed by reacting sulphuric acid with the aluminum silicate which characterizes various clays or with various aluminum salts (such as alum) which on reaction with sulphuric acid form acid aluminum sulphates The substance formed may be defined by the general formula $Al_2(SO_4) \cdot XH_2SO_4 \cdot YH_2O$. X may vary from 1 to 5, and Y probably does not exceed 10.

Preferably clay is used to supply the bonding constituent because clay is inexpensive and generally available. Furthermore, if the bonded material (e. g. fire brick) be subjected to high temperatures, the clay will form a ceramic bond in use when sufficiently high temperatures are reached.

The clay or clay constituents and the other aggregates, if any, are preferably thoroughly mixed with a small amount (preferably 2 to 5%) of sulphuric acid (e. g. commercial concentrated sulphuric acid). As will presently appear, a still greater amount of acid would be necessary if the clay mineral contained a large proportion of very fine particle sizes. Commercial concentrated sulphuric acid (66Bé.) contains about 2 to 5% water. Water is not required unless it be necessary to secure the desired working consistency. Excess water should be avoided, since most of it must eventually be driven off to develop maximum strength. Some water is formed in the reaction, thus:

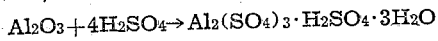

Full strength is not developed until substantially all free water is driven off. This does not require high temperatures. Heat probably promotes reaction and is preferably used to facilitate removal of excess or uncombined water. Temperatures of 250° F. are satisfactory. Upon completion of the reaction, the strengths obtained (in dry pressed brick, for example) are equal to those of conventional good quality burned fire brick. In brick, for practical purposes, strengths need not exceed a modulus of rupture of 500 pounds per square inch. Resistance to water is a characteristic of the acid aluminum sulphate bond (as contrasted with aluminum sulphate) and indicates generally the extent of formation of acid aluminum sulphate as compared with aluminum sulphate, that is, moisture resistance increases with strength. For fire brick, the water resistance is adequate for all practical purposes.

The amount of acid necessary to develop sufficient acid aluminum sulphate to secure adequate bonded strength varies in general with the fineness of the particles of clay or clay constituents; i. e., with the surface area to be bonded. For example, only 3 to 4% of acid is required for a clay having the following screen analysis:

|  | Per cent |
|---|---|
| Minus 4 plus 20 mesh | 50 |
| Minus 20 plus 65 mesh | 15 |
| Minus 65 mesh | 35 | whereas about 9% acid is required to secure the same strength for finer clay; e. g. 80% through 100 mesh.

The foregoing seems to apply regardless of the type of clay mineral employed. Generally kaolins (comprising the clay mineral kaolinite) are coarser than montmorillonite and are preferred where it is desirable to minimize the amount of acid necessary. Ignoring particle size, any of the common clay minerals, kaolinite, montmorillonite, illite and their variants, react equally well to provide a strong bond. Maximum strength with a minimum amount of acid can be obtained with clay aggregates if the particle sizes be graded for minimum porosity. If the clay particles be relatively weak, very coarse sizes (4 mesh and larger) should be avoided where maximum strength is required. Limitation of maximum aggregate sizes does not apply where the aggregate bonded is adequate strong, but for maximum strength the aggregate sizes should be graded to secure minimum porosity.

Roasting or calcining of the clay apparently has the same effect as reduction in size of the clay particles (as regards amount of acid necessary) since such treatment makes the particles porous and thus increases the surface area available for reaction with the acid.

The use of excess acid is immediately revealed in reduction in strength of the bonded material. Apparently no more than five molecules of acid will combine with the $Al_2O_3$, thus:

$$Al_2(SO_4)_3 \cdot 5H_2SO_4 YH_2O$$

Excess acid is present as free acid and weakens the bond. Free acid may be present even though a substantial amount of the clay be unreacted. Apparently this results because the film of acid aluminum sulphate around a clay particle is relatively impervious and prevents the acid from reaching and reacting with the interior of the particle. In other words, the acid aluminum sulphate is advantageously formed only on the surfaces of the clay particles, where it can act efficiently as a bonding agent. It is likely therefore that no more bonding agent than can function efficiently as such, is formed, excess acid being present simply as free acid. A deficiency of acid, on the other hand, probably limits a portion of the reaction to the formation of aluminum sulphate, instead of continuing the reaction to form acid aluminum sulphate. Aluminum sulphate, while functioning as a relatively poor bonding agent, is not moisture resistant, and is therefore unsatisfactory.

Strength can be greatly increased, of course, by the use of pressure in one form or another, since it increases the intimacy of contact essential for a strong bond. Pressures may be applied by the conventional brick or other press, and by briquetting, by extrusion, and the like, or by rolling or compacting in situ. Any manipulation of the material which improves intimacy of contact is beneficial as regards strength. A substantial amount of finely sized clay particles (requiring an appropriate increase of acid) generally increases plasticity and therefore intimacy of contact.

The invention is not limited to any particular class of product or any particular method of fabrication. It may be used to bond a wide variety of materials for various uses. If clay or clay minerals be not naturally present they may be added for developing a bond. Among other uses, the invention has great utility in the manufacture of unfired clay refractories, and other unfired clay products and structures containing clay.

In the form of fire brick or other refractories, the novel products have a lower heat conductivity than the conventional fired brick even though they are somewhat heavier. This is because the ceramic or vitreous bond in the conventional fire brick has a relatively higher conductivity than the bond in the present brick; and even though the latter be subject to temperatures in use which develop a ceramic bond, the latter is formed only to the extent of penetration of high temperatures into the brick and not throughout the brick.

In other respects, the brick has great utility as ladle brick and elsewhere as a refractory, because they may be formed to exact and true size (shrinkage and warping being eliminated), thereby making it possible to lay up the brick with minimum joints. Furthermore, their resistance to moisture absorption makes it possible to lay up the brick or other refractories with a mortar joint of minimum thickness. Retention of plasticity makes it possible on laying up the refractories to work the joint down until there is practically face to face contact, leaving only a very thin film of mortar. Thus laid, there is no tendency of the refractories to slip on each other, a difficulty which would be encountered if the plastic mortar joint had any substantial thickness. Minimum joints are very important in refractory structures, since the mortar may be less refractory or have a fluxing action. In ladles, for example, entry of steel between the ladle brick is prevented.

Another advantageous use of the invention is bonding together iron ores and concentrates thereof, which because of their extremely fine form, cannot be directly used. This includes also blast furnace flue dust which is collected and contains a high percentage of iron. If the iron does not naturally contain enough clay or clay constituents to develop a bond, up to 10% of clay or clay constituent may be added. About 3% of sulphuric acid is added and thoroughly mixed with the dry constituents; and the mixture is then briquetted, extruded or otherwise put into a form suitable for use in blast furnaces or open hearth furnaces. When heated to dryness, the briquettes have great strength. Moisture is preferably minimized to facilitate drying. For formation by extrusion or other methods of formation requiring greater plasticity, greater amounts of water may, of course, be required. The very large reserves of iron or of the foregoing character may thus be made available for the steel industry.

While there is probably some reaction (such as the following) between the acid and the iron constituent of the ore to form a bonding substance, apparently some clay constituents are necessary to provide an adequate bond:

$$Fe_2O_3 + 3H_2SO_4 \rightarrow Fe_2(SO_4)_3 + 3H_2O$$

and with an excess of acid $$\rightarrow Fe_2(SO_4)_3 \cdot XH_2SO_4 \cdot YH_2O$$

While sulphur is objectionable in the reducing conditions existing in a blast furnace, for example, the sulphur thus added in bonding the ore causes no additional difficulty because some sulphur is always present and must be eliminated by the addition of desulphurizing agents; and the presence of the small amount of additional sulphur does not add to this difficulty.

The invention has great utility also in bonding other materials in which clay is only a minor constituent, such, for example, as in foundry cores and foundry sand and other structures formed in situ. The so-called dry bond strength contributed by the clay may be greatly increased by the addition of only about 3% sulphuric acid on the amount of clay present. When dry, a very strong water resistant bond develops. Cores and molds thus bonded may be used more than once. The amount of sulphur added by the acid is very minute because the clay comprises only about 5 to 15% of the total.

Carbon and graphite, mixed with the bonding substances, may be advantageously bonded in the same manner for use either as refractories or electrodes. This eliminates costly firing under reducing conditions.

The invention is equally applicable for unfired articles of clay or containing clay where the clay must be in a wet or slurry condition. This applies to clay mortars, plasters, and articles made from clay slips or slurries. It is necessary to drive off the free moisture to obtain full strength after formation of the article for placing of the mortar or plaster.

The amount of acid used is so small that it does not present an obstacle in handling, nor does it damage machinery. Indeed, plastic and cementitious mixtures may advantageously be made up and packaged in moist plastic condition in tight containers which prevent evaporation of moisture, and thus kept ready for use for long periods in plastic condition. Such mixtures may be used, when necessary, for patching, etc. When exposed to air and the free moisture evaporated, full strength is obtained without firing.

Obviously the invention is not limited to the details of the illustrative embodiments of the invention since these may be variously modified. Moreover, it is not indispensable that all features of the invention be used conjointly, since various features may be used to advantage in different combinations and sub-combinations.

Having described our invention, we claim:

1. The method of bonding mineral aggregates, which comprises mixing the aggregates with clay and from 2% to 5% sulphuric acid, the said aggregates being substantially non-reactive with said acid, forming the mixture, and heating the formed article to temperatures substantially in excess of 212° F. to develop a bond of acid aluminum sulphate by reaction with the clay and acid.

2. An unfired refractory containing mineral aggregates and clay bonded with acid aluminum sulphate formed by reacting a portion of the clay with sulphuric acid, the said mineral aggregates being substantially incapable of reacting with said acid.

3. A plastic mixture comprising mineral aggregates and clay mixed with 2% to 9% of concentrated sulphuric acid, said aggregates being substantially incapable of reacting with said acid, said mixture being adapted to form a bond upon elimination of free water therefrom.

4. An unfired ceramic article comprising mineral aggregates including clay particles of graded screen sizes wherein only about 35% is smaller than 65 mesh, said clay being bonded by acid aluminum sulphate formed by the reaction between the clay and about 3% to 4% of sulphuric acid, only the said clay in the mineral aggregates being reactive with said acid.

5. The method of making fire brick of uniform and accurate size which comprises mixing a refractory aggregate consisting substantially entirely of fire clay of conventional screen sizes for ordinary fire brick with about 3% to 4% sulphuric acid, pressing the mixture, and then applying heat to about 250° F. to complete the reaction between the clay and the acid to form acid aluminum sulphate.

6. The method of bonding minerals which comprises mixing an aluminum compound of the group consisting of alumina, and aluminum silicate with 2% to 9% of concentrated sulphuric acid to react with the aluminum compound to form acid aluminum sulphate, forming the mixture, and applying heat to complete the formation of said acid aluminum sulphate.

7. An unfired refractory comprising in combination a refractory aggregate containing clay and bonded with a bonding substance comprising acid aluminum sulphate resulting from the reaction of said clay with sulphuric acid, the amount of acid being 2% to 9% of the clay, said aggregate except the clay being inert to sulphuric acid.

8. An unfired pressed brick or the like comprising in combination a refractory aggregate containing clay compressed together and bonded by acid aluminum sulphate formed by reacting the clay with about 2% to 9% of concentrated sulphuric acid, said aggregate except the clay being inert to sulphuric acid.

9. The method of making an unfired refractory bonded with acid aluminum sulphate which comprises mixing a refractory aggregate containing clay with concentrated sulphuric acid equivalent to about 2% to 5% of the clay present to react therewith to form acid aluminum sulphate, the said aggregate except for the clay being non-reactive with said acid, forming the mixture under pressure, and then applying heat to drive off free water and to complete the reaction between the sulphuric acid and clay to form acid aluminum sulphate.

10. A chemically bonded, high strength, refractory brick consisting essentially of a refractory aggregate including clay bonded with a minor proportion of acid aluminum sulphate.

11. The method of producing a chemically bonded, high strength, refractory brick which comprises heating a pressed shaped refractory aggregate comprising clay and 2 to 5% of sulphuric acid to a temperature substantially in excess of 212° F. to develop a bond of acid aluminum sulphate and maintaining said temperature at below the decomposition temperature of said acid aluminum sulphate.

HOWARD F. WEST.
JOHN H. VEALE.

References Cited in the file of this patent

UNITED STATES PATENTS

| Number | Name | Date |
| --- | --- | --- |
| 259,532 | Gurney | June 13, 1882 |
| 267,755 | Moffitt | Nov. 21, 1882 |

FOREIGN PATENTS

| Number | Country | Date |
| --- | --- | --- |
| 8,413 | Great Britain | 1890 |
| 15,437 | Great Britain | 1902 |
| 233,907 | Great Britain | 1925 |